(12) United States Patent
Kim (10) Patent No.: US 11,104,181 B2
(45) Date of Patent: Aug. 31, 2021

(54) INFLATION FILM AND MANUFACTURING METHOD THEREOF

(71) Applicant: KOLON INDUSTRIES, INC., Gwacheon-si (KR)

(72) Inventor: Yun-Jo Kim, Youngin-si (KR)

(*) Notice: Subject to any disclaimer, the term of this patent is extended or adjusted under 35 U.S.C. 154(b) by 113 days.

(21) Appl. No.: 15/757,416

(22) PCT Filed: Sep. 29, 2016

(86) PCT No.: PCT/KR2016/010926
§ 371 (c)(1),
(2) Date: Mar. 5, 2018

(87) PCT Pub. No.: WO2017/057931
PCT Pub. Date: Apr. 6, 2017

(65) Prior Publication Data
US 2018/0244102 A1    Aug. 30, 2018

(30) Foreign Application Priority Data

Sep. 30, 2015    (KR) .................. 10-2015-0137720

(51) Int. Cl.
*B60C 1/00*     (2006.01)
*C08J 5/18*     (2006.01)
(Continued)

(52) U.S. Cl.
CPC ............ *B60C 1/0008* (2013.01); *B60C 1/00* (2013.01); *B60C 5/14* (2013.01); *C08G 69/40* (2013.01); *C08J 5/18* (2013.01); *C08L 23/00* (2013.01); *C08L 77/00* (2013.01); *C09J 7/243* (2018.01); *C09J 7/25* (2018.01); *C09J 7/30* (2018.01); *C08J 2351/06* (2013.01);
(Continued)

(58) Field of Classification Search
None
See application file for complete search history.

(56) References Cited

U.S. PATENT DOCUMENTS 4,899,521 A * 2/1990 Havens .................. B32B 27/08
53/461
6,051,649 A    4/2000 Alex et al.
(Continued)

FOREIGN PATENT DOCUMENTS

| CN | 104884560 | 9/2015 |
| EP | 3006531 | 4/2016 |

(Continued)

OTHER PUBLICATIONS

EPO, European Search Report of EP 16852077.3 dated Mar. 11, 2019.
(Continued)

*Primary Examiner* — Monica A Huson
(74) *Attorney, Agent, or Firm* — Harvest IP Law, LLP (57) ABSTRACT

The present invention relates to an inflation film and a method for manufacturing the inflation film, wherein the inflation film includes a base film, including: a polyamide-based resin; a copolymer containing polyamide-based segments and poly-ether-based segments; and an olefin-based polymer compound, and has a small variation in physical properties between a machine direction (MD) and a transverse direction (TD) of the film.

7 Claims, 1 Drawing Sheet

(51) Int. Cl.
*C08L 23/00* (2006.01)
*C08G 69/40* (2006.01)
*C08L 77/00* (2006.01)
*C09J 7/24* (2018.01)
*C09J 7/25* (2018.01)
*C09J 7/30* (2018.01)
*B60C 5/14* (2006.01)
*C09J 161/12* (2006.01)

(52) U.S. Cl.
CPC ........ *C08J 2377/02* (2013.01); *C08J 2477/02* (2013.01); *C09J 161/12* (2013.01); *C09J 2203/00* (2013.01); *C09J 2451/006* (2013.01); *C09J 2461/00* (2013.01); *C09J 2477/006* (2013.01)

(56) References Cited

U.S. PATENT DOCUMENTS

| | | | |
|---|---|---|---|
| 2006/0226572 A1* | 10/2006 | Tanaka | C08L 27/16 264/176.1 |
| 2013/0192736 A1 | 8/2013 | Song et al. | |
| 2014/0242370 A1* | 8/2014 | Song | C09J 7/22 428/220 |
| 2015/0017361 A1* | 1/2015 | Kim | B29D 30/06 428/35.7 |
| 2015/0329744 A1 | 11/2015 | Jeong et al. | |
| 2016/0032053 A1* | 2/2016 | Kato | C08G 69/40 428/220 |
| 2016/0107483 A1 | 4/2016 | Jeong et al. | |
| 2016/0311259 A1 | 10/2016 | Shimizu et al. | |

FOREIGN PATENT DOCUMENTS

| | | | | |
|---|---|---|---|---|
| JP | S6490236 A | 4/1989 | | |
| JP | 2002-088240 | 3/2002 | | |
| JP | 2007-030691 | 2/2007 | | |
| JP | 2011-056812 | 3/2011 | | |
| JP | 2012-036244 | 2/2012 | | |
| JP | 2014-523364 | 9/2014 | | |
| KR | 10-2011-0110024 | 10/2011 | | |
| KR | 10-2013-0009620 | 1/2013 | | |
| KR | 10-2014-0139433 | 12/2014 | | |
| KR | 10-2015-0037675 | 4/2015 | | |
| KR | 10-2015-0037676 | 4/2015 | | |
| WO | 2013-133666 | 9/2013 | | |
| WO | WO-2013133666 A1 * | 9/2013 | ............... | B60C 5/14 |
| WO | WO-2014168011 A1 * | 10/2014 | ........... | B60C 1/0008 |
| WO | 2014-193147 | 12/2014 | | |
| WO | 2015-093001 | 6/2015 | | |

OTHER PUBLICATIONS

WIPO, PCT Search Report & Written Opinion of PCT/KR2016/010926 dated Jan. 16, 2017.

* cited by examiner

INFLATION FILM AND MANUFACTURING METHOD THEREOF

CROSS-REFERENCE TO RELATED APPLICATION(S)

This application claims priority to and the benefit of Korean Patent Application No. 10-2015-0137720 filed on Sep. 30, 2015 with the Korean Intellectual Property Office, the disclosure of which is incorporated herein by reference in its entirety.

TECHNICAL FIELD

The present invention relates to an inflation film and a manufacturing method thereof. More specifically, the present invention relates to a method for manufacturing an inflation film for inner liners that can exhibit physical properties that are uniform and excellent in all directions, have a low modulus while having relatively high tensile strength and impact strength, realize excellent gas barrier properties even with a thin thickness, reduce the weight of a tire, and improve fuel efficiency of an automobile, and a manufacturing method thereof.

BACKGROUND OF ART

A tire serves to withstand the weight of an automobile, reduce impact from a road surface, and transfer driving force or braking force of an automobile to the ground.

Figure 1:
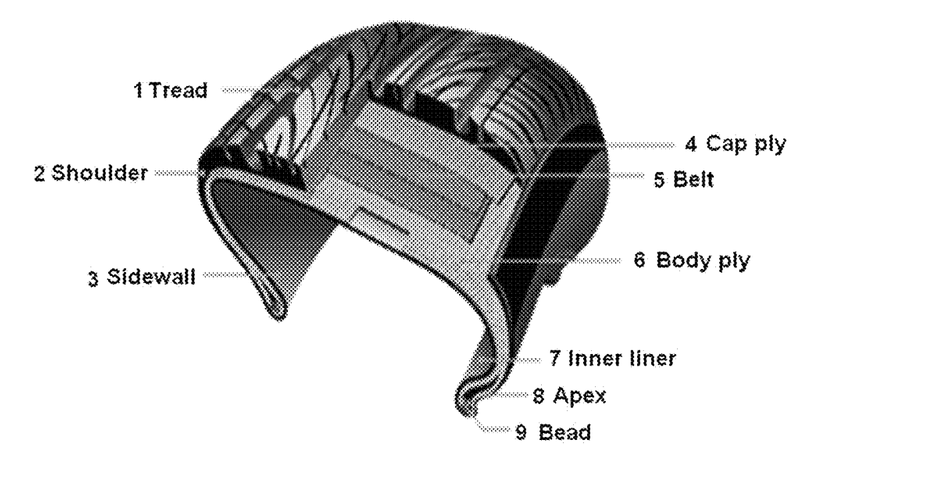
FIG. 1 schematically illustrate the structure of a tire.

In general, a tire is a complex of fiber/steel/rubber, and normally has a structure as shown in FIG. 1.

Tread 1: A part contacting the road surface. It should afford frictional force required for driving, have good wear resistance, withstand external impact, and have low heat generation.

Body ply, or carcass 6: A cord layer in the tire. It should support the weight, withstand impact, and have high fatigue resistance to bending and stretching during running.

Belt 5: Located between the body plies, it consists of steel wire in most cases, reduces external impact, and maintains a wide tread to afford excellent vehicle running stability.

Side Wall 3: Refers to a rubber layer between a part below a shoulder 2 and a bead 9. It serves to protect the inner body ply 6.

Inner liner 7: Located inside the tire instead of a tube, and prevents air leakage to enable a pneumatic tire.

Bead 9: Square or hexagonal wire bundle formed of rubber-coated steel wire. It serves to seat and fix the tire in a rim.

Cap ply 4: A special cord located on a belt of a radial tire for some cars. It minimizes movement of the belt during running.

Apex 8: A triangular rubber filler used to minimize dispersion of the bead, reduce external impact to protect the bead, and prevent air inflow during molding.

Recently, a tubeless tire in which high pressure air of about 30 to 40 psi is injected has been commonly used without using a tube, and in order to prevent air leakage during automobile running, an inner liner having high gas barrier properties is positioned as an inner layer of the carcass.

Previously, a tire inner liner including rubber ingredients such as butyl rubber, halobutyl rubber, or the like having relatively low air permeability as a main ingredient was used, but in order to achieve sufficient gas barrier properties of the inner liner, the rubber content or inner liner thickness should be increased.

However, if the rubber content and tire thickness increase, there are problems that the total weight of the tire is increased and the fuel efficiency of an automobile is lowered.

Moreover, in a vulcanization process of a tire or in an automobile running process during which repeated deformations occur at high temperatures, because the rubber ingredients have relatively low heat resistance, air pockets may be generated between rubber in the inner surface of a carcass layer and the inner liner, or the shape or physical properties of the inner liner may be changed.

Further, in order to bond the rubber ingredients to a carcass layer of a tire, a vulcanizing agent should be used or a vulcanization process should be applied, but this also makes it difficult to secure sufficient adhesion.

Thus, in order to decrease the thickness and weight of an inner liner to reduce fuel efficiency, and reduce a change in the shape or properties of an inner liner generated in a tire molding or running process, etc., various methods have been suggested.

However, previously known methods have limitations in maintaining excellent air permeability and moldability of a tire while sufficiently decreasing the thickness and the weight of the inner liner.

Further, the inner liner obtained by previously known methods exhibited phenomena such as degradation of physical properties, generation of cracks, and the like, in a tire manufacturing process during which repeated deformations occur at a high temperature, or in an automobile running process during which repeated deformations occur and high heat is generated.

DETAILED DESCRIPTION OF THE INVENTION

Technical Problem

It is an object of the present invention to provide an inflation film for inner liners that can exhibit physical properties that are uniform and excellent in all directions, have a low modulus while having a relatively high tensile strength and impact strength, realize excellent gas barrier properties even with a thin thickness, reduce the weight of a tire, and improve the fuel efficiency of an automobile, and a manufacturing method thereof.

It is another object of the present invention to provide a method for manufacturing an inflation film.

Technical Solution

The present disclosure provides an inflation film including a base film, including: a polyamide-based resin; a copolymer containing polyamide-based segments and poly-ether-based segments; and an olefin-based polymer compound, wherein a ratio of a machine direction modulus of the base film to a transverse direction modulus of the base film at 25% elongation immediately after heat-treating the base film at 170° C. for 30 minutes, is from 0.8 to 1.2.

The present disclosure also provides a method for manufacturing the inflation film including a step of expanding a molten resin composition including: a polyamide-based resin; a copolymer containing polyamide-based segments and poly-ether-based segments; and an olefin-based polymer compound at a blow-up ratio (BUR) of 1.5 to 3.

An inflation film and a method for manufacturing an inflation film according to specific embodiments of the invention will be described in more detail below.

According to one embodiment of the invention, an inflation film including a base film, including: a polyamide-based resin; a copolymer containing polyamide-based segments and poly-ether-based segments; and an olefin-based polymer compound may be provided, wherein the ratio of the machine direction modulus of the base film to the transverse direction modulus of the base film at 25% elongation immediately after heat-treating the base film at 170° C. for 30 minutes, is from 0.8 to 1.2.

The present inventors conducted extensive studies and experiments, and found that a film produced by inflation molding of raw materials including the polyamide-based resin, the copolymer containing specific segments, and the olefin-based polymer compound together can maintain physical properties to be stable in the transverse direction (TD) of the film even after high temperature heat treatment by stretching in a molten state in the transverse direction (TD) of the film, unlike an ordinary flat cast film, thereby further reducing a variation in physical properties between a machine direction (MD) and a transverse direction (TD) of the film. The present invention has been completed on the basis of such finding.

Since the inflation film has physical properties that are uniform in the machine direction (MD) and the transverse direction (TD) of the base film even after high temperature heat treatment, stress applied to the film during the molding process and the vulcanization process of a tire can be uniformly dispersed, thus providing excellent moldability. Further, due to the physical property balance between the machine direction (MD) and the transverse direction (TD) of the base film, it is easy to disperse the stress applied from the outside, and the durability can be further improved by delaying the phenomenon in which the occurrence and propagation of cracks are accelerated by concentration of stress in one direction.

The inflation film can be manufactured by a method including: a step of forming a tube-shaped bubble in which raw materials including the polyamide-based resin, the copolymer containing specific segments, and the olefin-based polymer compound together are continuously produced through an extruder die in a molten state; a step of blowing a predetermined amount of air into the bubble to inflate the film in the width direction; a step of cutting both folded sides of the bubble by a device part such as a nip roll to divide the same into two flat forms; and a step of winding the film in a roll form after edge-trimming both sides of the flat film.

The inflation film can be used as an inner liner of a tire.

When the inflation film is used as an inner liner, it can achieve the gas barrier properties even with a thin thickness, reduce the weight of a tire and improve the fuel efficiency of an automobile, and further exhibit mechanical properties such as excellent durability and fatigue resistance together with excellent moldability while having high heat resistance.

The inflation film of one embodiment has a sea-island morphology in which a soft domain is structurally formed in an island shape in a hard domain, and sizes of soft domains in the machine direction (MD) and the transverse direction (TD) of the film are uniform. Thereby, the inflation film can have physical properties that are uniform in all directions, and a stress concentration phenomenon can be reduced by dispersing the stress applied from the outside.

As described above, the inflation film of one embodiment can exhibit physical properties that are uniform and excellent in all directions, and have a low modulus while having relatively high tensile strength and impact strength. Specifically, the ratio of the machine direction modulus of the base film to the transverse direction modulus of the base film at 25% elongation after heat-treating the base film at 170° C. for 30 minutes may be from 0.8 to 1.2.

That is, when the machine direction (MD) modulus of the base film and the transverse direction (TD) modulus of the base film were respectively measured by heat-treating the base film at 170° C. for 30 minutes and applying elongation of 25% thereto, the ratio of the machine direction modulus of the base film to the transverse direction modulus of the base film may be from 0.8 to 1.2.

Specifically, each modulus in the machine direction (MD) and the transverse direction (TD) measured after heat-treating the base film at 170° C. for 30 minutes and applying elongation of 25% thereto can be defined as a value of strength measured by a method in which the base film is left for 24 hours under the conditions of 23° C. and 50% relative humidity, one side end of the base film layer is suspended in a hot air oven at 170° C., and left (heat-treated) in a no-load and no-contact state for 30 minutes, and immediately thereafter, the strength is measured at 25% elongation in the machine direction and the transverse direction by applying a tensile speed of 300 mm/min to specimens having a length of 30 mm and a width of 30 mm using a universal tensile test machine (Instron Inc.).

Further, the ratio of the machine direction impact strength of the base film to the transverse direction impact strength of the base film, measured after heat-treating the base film at 170° C. for 1 hour, may be from 0.8 to 1.2.

Specifically, each impact strength in the machine direction and the transverse direction, measured after heat-treating the base film at 170° C. for 1 hour, can be defined as a heat-resistant impact strength measured by a method in which the base film is left for 24 hours under the conditions of 23° C. and 50% relative humidity, one side end of the base film layer is suspended in a hot air oven of 170° C., and left (heat-treated) in a no-load and no-contact state for 1 hour, and immediately thereafter, the heat-resistant impact strength in the machine direction and the transverse direction of the heat-treated base film is measured under the conditions of 23° C. and 50% relative humidity using a pendulum impact tester (Zwick/Roell, Model HIT 5.5P) according to ISO 8256 Method A.

As the inflation film of one embodiment satisfies the ratio of the machine direction modulus of the base film and the transverse direction modulus of the base film as well as the ratio of the machine direction impact strength of the base film to the transverse direction impact strength of the base film as described above, the stress applied to the film during the molding process and the vulcanization process of a tire can be uniformly dispersed to alleviate residual stress of the base film, thereby minimizing heat generation and durability reduction caused by a stress concentration phenomenon during an automobile running process while ensuring improved moldability.

Meanwhile, the polyamide-based resin contained in the base film may have relative viscosity (96% sulfuric acid solution) of 2.5 to 4.0, preferably 3.2 to 3.8.

If the viscosity of the polyamide-based resin is less than 2.5, sufficient elongation may not be secured due to a decrease in toughness, and thus, damage may be generated during tire manufacture or automobile running, and it may be difficult to secure physical properties such as gas barrier property or moldability, etc. required for a polymer film for an inner liner.

Further, if the viscosity of the polyamide-based resin is greater than 4.0, the modulus or viscosity of the prepared base film may become unnecessarily high, and it may be difficult for a tire inner liner to have appropriate moldability or elasticity.

The relative viscosity of the polyamide-based resin refers to relative viscosity measured using a 96% sulfuric acid solution at room temperature.

Specifically, a specimen of polyamide-based resin (for example, a 0.025 g specimen) is dissolved in a 96% sulfuric acid solution at different concentrations to prepare two or more measuring solutions (for example, a polyamide-based resin specimen is dissolved in 96% sulfuric acid to have concentrations of 0.25 g/dL, 0.10 g/dL, 0.05 g/dL, thereby preparing three measuring solutions), and then the relative viscosity of the measuring solutions (for example, the ratio of the average passing time of the measuring solutions to the passing time of the 96% sulfuric acid solution through a viscosity tube) may be calculated using a viscosity tube at 25° C.

Specific examples of the polyamide-based resin that can be used in the base film include nylon 6, nylon 66, nylon 46, nylon 11, nylon 12, nylon 610, nylon 612, a copolymer of nylon 6/66, a copolymer of nylon 6/66/610, nylon MXD6, nylon 6T, a copolymer of nylon 6/6T, a copolymer of nylon 66/PP, a copolymer of nylon 66/PPS, or N-alkoxyalkylated products thereof, for example, a methoxymethylated product of 6-nylon, a methoxymethylated product of 6-610-nylon, and a methoxymethylated product of 612-nylon, and it is preferable to use nylon 6, nylon 66, nylon 46, nylon 11, nylon 12, nylon 610, or nylon 612.

The base film includes a polyamide-based resin and copolymers containing polyamide-based segments and polyether-based segments together, and thus may have a relatively low modulus together with excellent gas barrier properties.

Specifically, due to the inherent molecular chain characteristics of the polyamide-based resin contained in the base film, the inflation film of one embodiment can exhibit a gas barrier property of about 10 to 20 times at the same thickness as compared with the butyl rubber generally used in a tire. The copolymer can be present in a state of being bonded or dispersed between the polyamide based resins, thereby further lowering the modulus of the base film, suppressing an increase in rigidity of the base film, and preventing the base film from being crystallized at a high temperature.

The copolymer containing polyamide-based segments and polyether-based segments may have a weight average molecular weight of 30,000 to 500,000, 70,000 to 300,000, or 90,000 to 200,000.

If the weight average molecular weight of the copolymer is less than 30,000, the prepared base film may not secure sufficient mechanical properties to be used for the polymer film for an inner liner, and it may be difficult for the polymer film for an inner liner to secure sufficient gas barrier properties. In some cases, it may cause a phenomenon where the stability of the bubble decreases during the inflation process.

Further, if the absolute weight average molecular weight of the copolymer is greater than 500,000, the modulus or crystallinity of the base film may excessively increase when heated to a high temperature, and it may be difficult to secure elasticity or elastic recovery rate required for a polymer film for an inner liner.

Herein, a weight average molecular weight means a weight average molecular weight in terms of polystyrene, measured by the GPC method.

In the process of measuring the weight average molecular weight in terms of polystyrene by GPC, commonly known analysis equipment, detectors such as a refractive index detector, and columns for analysis may be used, and commonly applied temperature conditions, solvents, and flow rates may be applied.

Specific examples of the measurement conditions may include a temperature of 30° C., a chloroform solvent, and a flow rate of 1 mL/min.

The content of the polyether-based segments in the base film may be 2% by weight to 40% by weight, 3% by weight to 35% by weight, or 4% by weight to 30% by weight.

If the content of the polyether-based segments is less than 2% by weight based on the total weight of the base film, the modulus of the base film or the inflation film used as an inner liner may increase, and thus tire moldability may be degraded, or degradation in physical properties due to repeated deformations may greatly occur.

If the content of the polyether-based segments is greater than 40 wt % based on the total weight of the film, the gas barrier property required for a tire inner liner is poor which causes deterioration of tire performance, reactivity to an adhesive may be lowered so that the inner liner may not be easily adhered to the carcass layer, and the elasticity of the base film may increase, making it difficult to manufacture a uniform film.

The polyamide-based segment may include a repeating unit of the following Chemical Formula 1 or Chemical Formula 2.

[Chemical Formula 1]

In Chemical Formula 1, $R_1$ is a linear or branched alkylene group having 1 to 20 carbon atoms, an arylene group having 6 to 20 carbon atoms or a linear or branched arylalkylene group having 7 to 20 carbon atoms.

[Chemical Formula 2]

In Chemical Formula 2, $R_2$ is a linear or branched alkylene group having 1 to 20 carbon atoms or an arylene group having 6 to 20 carbon atoms, and $R_3$ is a linear or branched alkylene group having 1 to 20 carbon atoms, an arylene group having 6 to 20 carbon atoms, or a linear or branched arylalkylene group having 7 to 20 carbon atoms.

Further, the polyether-based segment of the copolymer may include a repeating unit of the following Chemical Formula 3.

[Chemical Formula 3]

In Chemical Formula 3, $R_5$ is a linear or branched alkylene group having 1 to 10 carbon atoms, n is an integer of 1 to 100, and $R_6$ and $R_7$ may be the same as or different from each other, and are independently a direct bond, —O—, —NH—, —COO—, or —CONH—.

Further, in the base film, the polyamide-based resin and the copolymer containing polyamide-based segments and poly-ether-based segments may be included at a weight ratio of 9:1 to 1:9, or 2:8 to 8:2.

If the content of the polyamide-based resin is too small, the density or gas barrier property of the base film may be lowered.

Further, if the content of the polyamide-based resin is too high, the modulus of the base film may excessively increase or moldability of a tire may be degraded, and the polyamide-based resin may be crystallized under a high temperature environment during tire manufacture or automobile running, and cracks may be generated due to repeated deformations.

Meanwhile, as the base film included in the inflation film of the embodiment includes the polyamide-based resin, the copolymer including polyamide-based segments and poly-ether-based segments, and the olefin-based polymer compound together, it can prevent the inflation film from being crystallized due to a high temperature, external impact, deformation, etc., and it can improve the fatigue resistance and durability even at a low temperature by lowering the modulus characteristic or increasing the elasticity while maintaining the other mechanical properties of the inflation film at the same level or more.

Specifically, the olefin-based polymer compound serves to increase the softness of the base film and improve the capability of absorbing impact applied from the outside, and it may prevent the phenomenon where the internal structure of the compound or polymer included in the base film is changed and crystallized, while significantly lowering the modulus of the base film.

The base film may contain the olefin-based polymer compound in an amount of 3% by weight to 35% by weight, or 10% by weight to 30% by weight. If the content of the olefin-based polymer compound is too small, the actions and effects resulting from the olefin-based polymer compound may be insignificant.

Further, if the content of the olefin-based polymer compound is too high, the physical properties or effects exhibited by the polyamide-based resin and the copolymers may be reduced, and when a tire is manufactured using the polymer film for inner liners, deterioration of physical properties due to heat can largely occur in the high-temperature vulcanization process.

The olefin-based polymer compound may include an olefin-based polymer, an olefin-based copolymer, an olefin-based polymer or copolymer grafted with a dicarboxylic acid or an acid anhydride thereof, or a mixture of two or more kinds thereof.

The olefin-based polymer may include polyethylene, polypropylene, or a mixture thereof.

The olefin-based polymer may include an ethylene-propylene copolymer, or an ethylene-acrylic ester-maleic anhydride terpolymer, an acrylic ester and maleic anhydride functionalized polyolefin, or a terpolymer of ethylene, butyl acrylate (BA), and glycidyl methacrylate (GMA).

As described above, the olefin-based polymer compound may include an olefin-based polymer or copolymer grafted with a dicarboxylic acid or an acid anhydride thereof, wherein the dicarboxylic acid may include maleic acid, phthalic acid, itaconic acid, citraconic acid, alkenyl succinic acid, cis-1,2,3,6-tetrahydrophthalic acid, 4-methyl-1,2,3,6-tetrahydrophthalic acid, or a mixture of two or more kinds thereof, and the dianhydride of dicarboxylic acid may be a dicarboxylic dianhydride of the above-mentioned examples.

Among the olefin-based polymer or copolymer grafted with dicarboxylic acid or an acid anhydride thereof, the content of grafted dicarboxylic acid or acid anhydride thereof may be 0.3% by weight or more, and preferably 0.5% by weight to 3.0% by weight.

Such a grafting ratio of dicarboxylic acid or acid anhydride thereof may be measured from the result obtained by acid-base titration of the olefin-based polymer compound.

For example, about 1 g of the olefin-based polymer compound is added to 1500 ml of xylene saturated with water, and refluxed for about 2 hours, followed by adding a small amount of a 1 wt % thymol blue-dimethylformamide solution, and subjected to slight excess titration with a 0.05 N sodium hydroxide-ethyl alcohol solution to obtain an ultramarine blue solution. Then, the solution is back-titrated with a 0.05 N hydrochloric acid-isopropyl alcohol solution until showing a yellow color to obtain the acid value, from which the amount of dicarboxylic acid grafted in the olefin-based polymer compound can be calculated.

The olefin-based polymer compound may have a density of 0.77 $g/cm^3$ to 0.95 $g/cm^3$, or 0.80 $g/cm^3$ to 0.93 $g/cm^3$.

The base film may have a thickness of 20 to 300 μm, preferably 40 to 250 μm, and more preferably 40 to 200 μm.

Thereby, the polymer film for inner liners according to one embodiment of the invention may have low air permeability, for example oxygen permeability of 200 $cm^3/(m^2 \cdot 24 \; h \cdot atm)$ or less, while having a thin thickness, compared to those previously known.

Meanwhile, the base film may further include a crosslinking agent.

As the base film further includes a crosslinking agent, the crystallinity of the base film itself or the tendency to be crystallized at a high temperature may be reduced.

Specifically, by using the crosslinking agent, crosslinking reactions may occur between the polymers used or synthesized in the preparation process of the base film, for example, (a) a polyamide-based resin and (b) copolymers including polyamide-based segments and polyether-based segments, each or each other, whereby the crystallinity of the base film may be lowered.

The crosslinking agent may include a compound containing an oxazoline functional group, a trimellitic anhydride, and a carbodiimide compound.

Particularly, as the base film includes such a crosslinking agent, the polymer film can have a sufficient strength and low modulus characteristics, and the degree of crystallization of the base film does not become so large even through molding or stretching at a high temperature of 100° C. or higher. Thus, the modulus characteristic, the elasticity, the elastic recovery rate, and the like are not greatly lowered, so that excellent moldability can be secured.

Meanwhile, the base film may further include a heat resistance agent. As the base film further includes a heat resistance agent, it is possible to prevent chain breakage of the polymer due to heat generated during the manufacturing process of the film or the manufacturing process of the tire, and it is possible to suppress the generation of radicals due to thermal decomposition. Thus, even if left or exposed under a high temperature environment for a long time, its physical properties may not be greatly deteriorated. That is, as a heat resistance agent is added to the base film, crystallization or a high degree of curing of the base film may be remarkably reduced even in the molding process of a tire, and generation of a crack or damage in the inner liner may be prevented even in an automobile running process during which repeated deformations are applied and a high temperature is generated.

The base film may contain the heat resistance agent in an amount of 0.005% by weight to 2.50% by weight, or 0.01% by weight to 1.00% by weight.

If the content of the heat resistance agent is too small, the effect of heat resistance improvement may be insignificant.

Further, if the content of the heat resistance agent is too high, the physical properties of the base film may be deteriorated, and there may be no substantial improvement in heat resistance depending on the used amount, thus unnecessarily increasing the cost of the final product.

Specific examples of the heat resistance agent include aromatic amine-based compounds, hindered phenol-based compounds, phosphorus compounds, inorganic compounds, polyamide-based compounds, polyether-based compounds, or a mixture of two or more thereof.

The heat resistance agent may be applied in the form of a powder, a liquid, or the like in the manufacturing method described later.

Meanwhile, the inflation film according to one embodiment may further include an adhesive layer that is formed on at least one side of the base film and includes a resorcinol-formalin-latex (RFL)-based adhesive.

The adhesive layer including resorcinol-formalin-latex (RFL)-based adhesive has excellent adhesion and adhesion maintaining performance to the base film layer and a tire carcass layer, and thus, it may prevent breaking of an interface between an inner liner film and a carcass lays, which is generated by heat or repeated deformations during tire manufacture or automobile running, to give sufficient fatigue resistance to the polymer film.

The resorcinol-formalin-latex (RFL)-based adhesive may include 2 to 32% by weight, preferably 10 to 20% by weight, of a condensate of resorcinol and formaldehyde, and 68 to 98% by weight, and preferably 80 to 90% by weight, of a latex.

The condensate of resorcinol and formaldehyde may be obtained by mixing resorcinol and formaldehyde at a molar ratio of 1:0.3 to 1:3.0, preferably 1:0.5 to 1:2.5, and then subjecting to a condensation reaction.

Further, the condensate of resorcinol and formaldehyde may be contained in an amount of 2% by weight or more based on the total weight of the adhesive layer in terms of a chemical reaction for excellent adhesion, and it may be contained in an amount of 32% by weight or less so as to secure adequate fatigue resistance.

The latex may be selected from the group consisting of natural rubber latex, styrene/butadiene rubber latex, acrylonitrile/butadiene rubber latex, chloroprene rubber latex, and styrene/butadiene/vinylpyridine rubber latex, or a mixture of two or more thereof.

The latex may be contained in an amount of 68% by weight or more based on the total weight of the adhesive layer for flexibility and an effective crosslinking reaction with rubber, and it may be contained in an amount of 98% by weight or less for a chemical reaction with a base film and stiffness of the adhesive layer.

The adhesive layer may have a thickness of 0.1 to 20 μm, preferably 0.1 to 10 μm, more preferably 0.2 to 7 μm, still more preferably 0.3 to 5 μm, and it may be formed on one side or both sides of the polymer film.

Meanwhile, according to another embodiment of the invention, a method for manufacturing the inflation film may be provided, including a step of inflating a molten resin composition including: a polyamide-based resin; a copolymer containing polyamide-based segments and poly-ether-based segments; and an olefin-based polymer compound, at a blow-up ratio (BUR) of 1.5 to 3.

The film produced by inflation molding of raw materials including the polyamide-based resin, the copolymer containing specific segments, and the olefin-based polymer compound together can exhibit physical properties that are uniform and excellent in all directions, and have a low modulus while having relatively high tensile strength and impact strength, unlike an ordinary flat cast film.

Specifically, according to the method for manufacturing an inflation film, an inflation film including a base film may be provided, including: a polyamide-based resin; a copolymer containing polyamide-based segments and poly-ether-based segments; and an olefin-based polymer compound, wherein the ratio of the machine direction modulus of the base film to the transverse direction modulus of the base film at 25% elongation after heat-treating the base film at 170° C. for 30 minutes, is from 0.8 to 1.2.

Moreover, the ratio of the machine direction impact strength of the base film to the transverse direction impact strength of the base film after heat treating the base film at 170° C. for 1 hour may be 0.8 to 1.2.

As described above, the inflation film can be manufactured by inflating a molten resin composition including: the polyamide-based resin; the copolymer containing polyamide-based segments and poly-ether-based segments; and the olefin-based polymer compound at a blow-up ratio (BUR) of 1.5 to 3, 1.8 to 2.7, or 2.0 to 2.5.

The blow-up ratio (BUR) can refer to a ratio at which the molten resin composition is stretched in the transverse direction after being extruded through a die to form a bubble, and specifically, it can be defined as the ratio of the bubble diameter to the die diameter.

When the blow-up ratio is excessively increased, for example, when the blow-up ratio in the manufacturing process of the inflation film is more than 3, the tensile strength in the machine direction (MD) decreases but the molecular orientation in the transverse direction (TD) increases, and thus the MD/TD physical property balance of the inflation film becomes poor, and the stability of the bubble is lowered in the process of manufacturing the inflation film, so that the processability may be lowered.

Further, when the blow-up ratio is less than 1.5, it is difficult to form a stable bubble, so that the finally produced inflation film may have a non-uniform thickness and poor physical properties, and may make manufacture of a film difficult.

In the step of inflating a molten resin composition at a blow-up ratio (BUR) of 1.5 to 3, the bubble diameter and the die diameter are not particularly limited, and can be appropriately adjusted in consideration of the size and physical properties etc. of the finally produced inflation film. For example, in the step of inflating a molten resin composition at a blow-up ratio (BUR) of 1.5 to 3, the bubble diameter may be 450 to 2000 mm, and the die diameter may be 300 to 800 mm.

In the step of inflating the molten resin composition at a blow-up ratio (BUR) of 1.5 to 3, if the die diameter is too small, the die shear pressure becomes too high and the shear stress becomes high in the melt extrusion process, so that it is difficult for the extruded film to form a uniform bubble, and thus the productivity may be deteriorated.

Further, in the step of inflating the molten resin composition at a blow-up ratio (BUR) of 1.5 to 3, if the die diameter is too large, uniform inflation due to air in the melt-extruded film is difficult, the shape stability of bubbles is reduced, the thickness becomes non-uniform, and wrinkle generation may be severe. Consequently, there may be a difficulty in obtaining uniform physical properties and the processability may be deteriorated.

Meanwhile, the molten resin composition can be inflated at a draw-down ratio (DDR) of 1 to 20.

The draw-down ratio (DDR) indicates the extent to which the bubbles are stretched in the longitudinal direction, and can be specifically defined as "die gap/(film thickness*blow-up ratio)".

Further, in the step of inflating the molten resin composition at a draw-down ratio (DDR) of 1 to 20, the die gap thickness may be 0.5 to 3.5 mm, and the film thickness may be 20 to 300 μm.

The temperature inside the bubble of the molten resin composition formed in the step of inflating the molten resin composition may be 10° C. to 60° C.

If the temperature inside the bubble of the molten resin composition is too low, a blocking phenomenon between the films due to the occurrence of condensation may occur or wrinkles may be introduced at the stage where the bubble is folded. Thus, in the step of cutting both sides of the film during the manufacturing process and dividing the cut sides into two flat forms, the processability is deteriorated and the physical properties may be non-uniform.

In addition, if the temperature inside the bubble of the molten resin composition is too high, the shape stability of the bubble may be deteriorated and wrinkles may be introduced or crystallization may occur to lower the uniformity of the bubble. Thus, the processability is lowered and the physical properties of the film may be deteriorated, which may lead to a decrease in durability.

The molten resin composition may be formed by melt-extruding raw materials including the polyamide-based resin, the copolymer containing polyamide-based segments and poly-ether-based segments, and the olefin-based polymer compound.

For example, the apparatus and method that can be used in the step of melting and extruding these raw materials are not particularly limited. For example, the method for manufacturing the inflation film may further include a step of melting and extruding the polyamide-based resin, the copolymer containing polyamide-based segments and poly-ether-based segments, and the olefin-based polymer compound at 200° C. to 300° C. to form the molten resin composition.

The melting temperature should be higher than the melting point of the polyamide-based compound. However, if the melting temperature is too high, carbonization or decomposition may occur and the physical properties of the film may be impaired, and bonding between the polyether resins may occur, or alignment occurs in the fiber alignment direction, which can be disadvantageous for manufacturing inflation films.

As described above, the inflation film is obtained by a method including: a step of forming the tube-shaped bubble in which raw materials including the polyamide-based resin, the copolymer containing specific segments, and the olefin-based polymer compound together are continuously produced through the extruder die in a molten state; a step of blowing a predetermined amount of air into the bubble to inflate the film in the width direction; a step of cutting both folded sides of the bubble by a device part such as a nip roll to divide the folded both sides into two flat forms; and a step of winding the composition in a roll state after edge-trimming both sides of the flat film.

Specifically, the method for manufacturing the inflation film may further include a step of folding the molten resin composition with a nip roll and then continuously stretching it in the machine direction (MD) of the film.

Further, in the method for manufacturing the inflation film, an inner-bubble-cooling (IBC) may be applied for controlling the temperature inside the bubble.

The details of the polyamide-based resin, the copolymer containing polyamide-based segments and poly-ether-based segments, and the olefin-based polymer compound are the same as those described for the inflation film of the one embodiment.

In addition, in the method for manufacturing the inflation film, methods and apparatuses commonly used in the inflation process of polymer films, except for the above-mentioned contents, can be used without any limitation.

Meanwhile, the method for manufacturing the inflation film may include a step of forming an adhesive layer that is formed on at least one side of the base film formed from the molten resin composition and includes a resorcinol-formalin-latex (RFL)-based adhesive.

The adhesive layer including the resorcinol-formalin-latex (RFL)-based adhesive may be formed by coating the resorcinol-formalin-latex (RFL)-based adhesive onto one side of the base film, and it may also be formed by laminating the resorcinol-formalin-latex (RFL)-based adhesive on one side of the base film.

Preferably, the step of forming the adhesive layer may be carried out by coating the resorcinol-formalin-latex (RFL)-based adhesive onto one side or both sides of the formed base film, followed by drying.

The formed adhesive layer may have a thickness of 0.1 μm to 20 μm, and preferably 0.1 μm to 10 μm.

The resorcinol-formalin-latex (RFL)-based adhesive may include 2 to 32% by weight of a condensate of resorcinol and formaldehyde, and 68 to 98% by weight, preferably 80 to 90% by weight, of a latex.

A commonly used application or coating method or apparatus may be used to apply the adhesive without particular limitations, but knife coating, bar coating, gravure coating, spraying, or immersion may be used.

However, knife coating, gravure coating, or bar coating may be preferable for uniform coating of the adhesive.

The details of the resorcinol-formalin-latex (RFL)-based adhesive are the same as those described for the inflation film of the one embodiment.

Advantageous Effects

According to the present invention, an inflation film for inner liners that can exhibit physical properties that are uniform and excellent in all directions, has a low modulus while having relatively high tensile strength and impact strength, that can realize excellent gas barrier properties even with a thin thickness, reduce the weight of a tire, and improve the fuel efficiency of an automobile, and a manufacturing method thereof, may be provided.

DETAILED DESCRIPTION OF THE EMBODIMENTS

Hereinafter, the present invention will be described in more detail with reference to the following examples. However, these examples are only to illustrate the invention and the scope of the invention is not limited thereto.

Example: Preparation of Polymer Film

Example 1

(1) Preparation of Base Film

A polyamide-based resin (nylon 6) with a relative viscosity (96% sulfuric acid solution) of 3.2 prepared from ε-caprolactam, a copolymer resin with a weight average molecular weight of about 92,000 (synthesized using 35 wt % of polyether-based segments having a polytetramethylene oxide as a main chain and 65 wt % of polyamide-based segments derived from ε-caprolactam), and an ethylene-propylene copolymer grafted with maleic anhydride (0.9 wt %) (density: 0.890 g/cm$^3$) were mixed at a weight ratio of 20:62:18, and 1 part by weight of an oxazoline-based compound and 0.3 parts by weight of a heat resistance agent [a mixture of copper iodide and potassium iodide—the content of copper (Cu) in the mixture: 7 wt %] were added relative to 100 parts by weight of the mixture to prepare a mixture for manufacturing a base film.

Then, the mixture was extruded at a temperature of 240° C. through a circular die (die gap—2.0 mm, die diameter 500 mm) while maintaining uniform flow of molten resin, and the temperature inside the bubble was adjusted to 17° C. by using an air ring and inner bubble cooler (IBC). By adjusting the air volume and the discharge volume of the blower, the blow-up ratio (BUR) of the bubble was set to 2.1 and the draw-down ratio (DDR) was set to 11.9, thereby forming a bubble with a diameter of 1050 mm.

Successively, the bubble was made in a flat form by using a nip-roll through a flat support, and both sides were cut with a knife-edge to make two flat films. Then, both sides of each film were cut and wound on a winder to obtain a flat base film having a thickness of 80 μm.

(2) Coating of Adhesive

Resorcinol and formaldehyde were mixed at a molar ratio of 1:2, and then subjected to a condensation reaction to obtain a condensate of resorcinol and formaldehyde. 15 wt % of the condensate of resorcinol and formaldehyde and 85 wt % of styrene/butadiene-1,3/vinylpyridine latex were mixed to obtain a resorcinol-formalin-latex (RFL)-based adhesive with a concentration of 25%.

Then, the resorcinol-formalin-latex (RFL)-based adhesive was coated onto both sides of the base film using a gravure coater, dried at 150° C. for 1 minute, and reacted to form adhesive layers each having a thickness of 3 μm on both sides.

Example 2

(1) Preparation of Base Film

A polyamide-based copolymer resin with a relative viscosity (96% sulfuric acid solution) of 3.8 [synthesized using ε-caprolactam and adipic acid at a weight ratio of 94:6], a copolymer resin with a weight average molecular weight of about 123,000 (synthesized using 20 wt % of polyether-based segments having an amine terminal group-containing polytetramethylene oxide as a main chain and 80 wt % of polyamide-based segments derived from ε-caprolactam), and an ethylene-propylene copolymer grafted with maleic anhydride (0.7 wt %) (density: 0.920 g/cm$^3$) were mixed at a weight ratio of 30:65:5, and 0.4 parts by weight of an oxazoline-based compound and 0.2 parts by weight of a heat resistance agent [a mixture of copper iodide and potassium iodide—the content of copper (Cu) in the mixture: 7 wt %] were added relative to 100 parts by weight of the mixture to prepare a mixture for manufacturing a base film.

Then, the mixture was extruded at a temperature of 230° C. through a circular die (die gap—3.0 mm, die diameter 400 mm) while maintaining uniform flow of molten resin, and the temperature inside the bubble was adjusted to 25° C. by using an air ring and inner bubble cooler (IBC). By adjusting the air volume and the discharge volume of the blower, the blow-up ratio (BUR) of the bubble was set to 2.88 and the draw-down ratio (DDR) was set to 8.0, thereby forming a bubble with a diameter of 1150 mm.

Successively, the bubble was made in a flat form by using a nip-roll through a flat support, and both sides were cut with a knife-edge to make two flat films. Then, both sides of each film were cut and wound on a winder to obtain a flat base film having a thickness of 130 μm.

(2) Coating of Adhesive

An adhesive layer was formed in the same manner as in Example 1, except that the adhesive layer with a thickness of 2 μm was formed on both sides of the base film.

Example 3

(1) Preparation of Base Film

A polyamide-based copolymer resin with a relative viscosity (96% sulfuric acid solution) of 3.8 [synthesized using ε-caprolactam and hexamethylene diamine at a weight ratio of 94:6], a copolymer resin with a weight average molecular weight of about 137,000 (synthesized using 16 wt % of polyether-based segments having an amine terminal group-containing polytetramethylene oxide as a main chain and 84 wt % of polyamide-based segments derived from ε-caprolactam), and an ethylene-propylene copolymer grafted with maleic anhydride (0.9 wt %) (density: 0.850 g/cm$^3$) were mixed at a weight ratio of 10:80:10, and 0.4 parts by weight of an oxazoline-based compound and 0.4 parts by weight of a heat resistance agent [a mixture of copper iodide and potassium iodide—the content of copper (Cu) in the mixture: 7 wt %] were added relative to 100 parts by weight of the mixture to prepare a mixture for manufacturing a base film.

Then, the mixture was extruded at a temperature of 230° C. through a circular die (die gap—2.5 mm, die diameter 700 mm) while maintaining uniform flow of molten resin, and the temperature inside the bubble was adjusted to 35° C. by using an air ring and inner bubble cooler (IBC). By adjusting the air volume and the discharge volume of the blower, the blow-up ratio (BUR) of the bubble was set to 1.64 and the draw-down ratio (DDR) was set to 15.2, thereby forming a bubble with a diameter of 1150 mm. Successively, the bubble was made in a flat form by using a nip-roll through a flat support, and both sides were cut with a knife-edge to make two flat films. Then, both sides of each film were cut and wound on a winder to obtain a flat base film having a thickness of 100 μm.

(2) Coating of Adhesive

An adhesive layer was formed in the same manner as in Example 1, except that the adhesive layer with a thickness of 5 μm was formed on both sides of the base film.

Example 4

(1) Preparation of Base Film

A polyamide-based copolymer resin with a relative viscosity (96 sulfuric acid solution) of 3.6 [synthesized using ε-caprolactam and hexamethylene diamine at a weight ratio of 94:6], a copolymer resin with a weight average molecular weight of about 74,000 (synthesized using 42 wt % of polyether-based segments having an amine terminal group-containing polytetramethylene oxide as a main chain and 58 wt % of polyamide-based segments derived from ε-caprolactam), and an ethylene-propylene copolymer grafted with maleic anhydride (0.8 wt %) (density: 0.910 g/cm$^3$) were mixed at a weight ratio of 70:20:10, and 0.5 parts by weight of an oxazoline-based compound and 0.7 parts by weight of a heat resistance agent [a mixture of copper iodide and potassium iodide—the content of copper (Cu) in the mixture: 7 wt %] were added relative to 100 parts by weight of the mixture to prepare a mixture for manufacturing a base film.

Then, the mixture was extruded at a temperature of 255° C. through a circular die (die gap—0.8 mm, die diameter 800 mm) while maintaining uniform flow of molten resin, and the temperature inside the bubble was adjusted to 20° C. by using an air ring and inner bubble cooler (IBC). By adjusting the air volume and the discharge volume of the blower, the blow-up ratio (BUR) of the bubble was set to 1.53 and the draw-down ratio (DDR) was set to 17.5, thereby forming a bubble with a diameter of 1220 mm.

Successively, the bubble was made in a flat form by using a nip-roll through a flat support, and both sides were cut with a knife-edge to make into two flat films. Then, both sides of each film were cut and wound on a winder to obtain a flat base film having a thickness of 30 μm.

(2) Coating of Adhesive

Resorcinol and formaldehyde were mixed at a molar ratio of 1:2.5, and then subjected to a condensation reaction to obtain a condensate of resorcinol and formaldehyde. 22 wt % of the condensate of resorcinol and formaldehyde and 78 wt % of styrene/butadiene-1,3/vinylpyridine latex were mixed to obtain a resorcinol-formalin-latex (RFL)-based adhesive with a concentration of 30%.

Then, the resorcinol-formalin-latex (RFL)-based adhesive was coated onto both sides of the base film using a gravure coater, dried at 150° C. for 1.5 minutes, and reacted to form adhesive layers each having a thickness of 10 μm on both sides.

Example 5

(1) Preparation of Base Film

A polyamide-based resin (nylon 6) with a relative viscosity (96% sulfuric acid solution) of 3.8 prepared from ε-caprolactam, a copolymer resin with a weight average molecular weight of about 137,000 (synthesized using 16 wt % of polyether-based segments having an amine terminal group-containing polytetramethylene oxide as a main chain and 84 wt % of polyamide-based segments derived from ε-caprolactam), and an ethylene-propylene copolymer grafted with maleic anhydride (0.8 wt %) (density: 0.910 g/cm$^3$) were mixed at a weight ratio of 8:70:22, and 0.2 parts by weight of an oxazoline-based compound and 1.0 part by weight of a heat resistance agent [a mixture of copper iodide and potassium iodide—the content of copper (Cu) in the mixture: 7 wt %] were added relative to 100 parts by weight of the mixture to prepare a mixture for manufacturing a base film.

Then, the mixture was extruded at a temperature of 230° C. through a circular die (die gap—2.2 mm, die diameter 600 mm) while maintaining uniform flow of molten resin, and the temperature inside the bubble was adjusted to 45° C. by using an air ring and inner bubble cooler (IBC). By adjusting the air volume and the discharge volume of the blower, the blow-up ratio (BUR) of the bubble was set to 1.83 and the draw-down ratio (DDR) was set to 5.7, thereby forming a bubble with a diameter of 1100 mm.

Successively, the bubble was made in a flat form by using a nip-roll through a flat support, and both sides were cut with a knife-edge to make two flat films. Then, both sides of each film were cut and wound on a winder to obtain a flat base film having a thickness of 210 μm.

(2) Coating of Adhesive

An adhesive layer was formed in the same manner as in Example 4, except that the adhesive layer with a thickness of 1 μm was formed on both sides of the base film.

Comparative Example: Preparation of Polymer Film (1) Preparation of Base Film

A polyamide-based resin (nylon 6) with a relative viscosity (96% sulfuric acid solution) of 3.8 prepared from ε-caprolactam, and a copolymer resin with a weight average molecular weight of about 137,000 (synthesized using 16 wt % of polyether-based segments having an amine terminal group-containing polytetramethylene oxide as a main chain and 84 wt % of polyamide-based segments derived from ε-caprolactam) were mixed at a weight ratio of 90:10 to prepare a mixture for manufacturing a base film.

Then, the mixture was extruded at a temperature of 255° C. through a T-type die (die gap—1.2 mm) while maintaining uniform flow of molten resin, and the molten resin was cooled and solidified in the shape of a film with uniform thickness using an air knife on the surface of a cooling roll that was controlled to 20° C. Then, a base film having a thickness of 100 μm was obtained at a speed of 10 m/min without passing through stretching and heating sections.

(2) Coating of Adhesive

A resorcinol-formalin-latex (RFL)-based adhesive was coated onto both sides of the base film using a gravure coater in the same manner as in Example 1, and dried and reacted at 150° C. for 1 minute to form adhesive layers each having a thickness of 3 μm on both sides.

EXPERIMENTAL EXAMPLE

Experimental Example 1: Oxygen Permeability Test

For the base films obtained in the examples and comparative example, oxygen permeability was measured under the conditions of 25° C. and 60 RH % using a gas transmission rate tester (Model BR-1/BT-2, manufactured by Toyoseiki Seisaku-Sho Company) according to ASTM D 1434.

Experimental Example 2: Modulus Balance at 25% Elongation

The base films obtained in the examples and comparative example were left for 24 hours under the conditions of 23° C. and 50% relative humidity, one side end of the base film layer was suspended in a hot air oven at 170° C. and then left (heat-treated) in a no-load and no-contact state for 30 minutes. Immediately thereafter, the value of the strength was measured ten times at 25% elongation in the machine direction (MD) and the transverse direction (TD) by setting a sample length to 30 mm, a sample width to 30 mm, and a tensile speed to 300 mm/min using a universal tensile test machine (Instron Inc.). Modulus values at 25% elongation at high temperature (170° C.) in the machine direction (MD) and the transverse direction (TD) were determined as an average value of eight values excluding the maximum value and the minimum value.

With the ratio of the modulus values at 25% elongation and high temperature (170° C.) in the machine direction (MD) and the transverse direction (TD) measured by the above-mentioned method, modulus balance could be confirmed, and was calculated as shown in the following Equation 1.

Modulus Balance=Machine Direction (MD) Modulus/Transverse Direction (TD) Modulus <Equation 1>

Experimental Example 3: Heat Resistant Impact Strength Ratio (MD/TD)

Heat resistant impact strength of the base films obtained in the examples and comparative example were measured as follows.

Heat resistant impact strength was measured using ISO 8256 Method A, and for the machine direction (MD) and the transverse direction (TD) of the base film, each of 10 specimens for evaluation were taken using a cutting device ISO 8256 Type 4.

Here, the specimen was cut such that the shape of the specimen for evaluation (specimen length×shoulder width×parallel specimen length×specimen width) became 60 mm×10 mm×25 mm×3 mm according to ISO 8256 Type 4, and the specimen for evaluation cut according to the standard was left under the conditions of 23° C. and 50% relative humidity for 24 hours, and then heat-treated in a hot air oven at 170° C. for 1 hour, and immediately thereafter, heat resistant impact strengths in the machine direction (MD) and the transverse direction (TD) of the heat treated base film were measured 10 times under a temperature of 23° C. and relative humidity of 50% using a Pendulum Impact Tester, Zwick/Roell Company, Model HIT 5.5P according to ISO 8256 Method A, and the mean values of 8 values excluding the maximum and minimum were calculated.

When measuring the heat resistant impact strength, in order to minimize a deviation due to the external environment, the specimens for evaluation were cut to a size required for measurement before heat treatment, and in order to minimize a change in physical properties, measurement was completed within 15 minutes after heat treatment.

The heat resistant impact strengths for the machine direction (MD) and the transverse direction (TD) of the base film were calculated according to the following Equation 2.

Heat Resistant Impact Strength (kJ/m$^2$)=Impact Energy (kJ)/[Film Thickness (m)×Specimen Width (0.003 m)] <Equation 2>

(Herein, the width of the specimen for evaluation was fixed to 3 mm)

In addition, the ratio of heat resistant impact strengths was calculated according to the following Equation 3.

Ratio of Heat Resistant Impact Strengths=(Heat Resistant Impact Strength for Machine Direction)/(Heat Resistant Impact Strength for Transverse Direction) <Equation 3>

Experimental Example 4: Determination of Moldability

Using the base films of the examples and comparative example as inner liners, each of 100 tires were manufactured with a standard of 205R/65R16.

During the tire manufacturing process, the manufacturability and appearance were evaluated after preparing a green tire, and the final appearance of a tire was examined after vulcanization.

Here, when there was no crushing of the green tire or the vulcanized tire and the standard deviation of the diameter was within 5%, it was evaluated as 'good'.

Also, when the green tire or the vulcanized tire was crushed, and thus a tire was not properly manufactured, or the inner liner inside the tire was melted or torn and damaged, or when the standard deviation of the diameter was greater than 5%, it was evaluated as 'poor'.

For the 100 tires manufactured using the base films of the examples and comparative example as tire inner liners, the number of tires having good appearance was confirmed to evaluate moldability, wherein the moldability was calculated by the following Equation 4.

Moldability (%)=Number of Tires Evaluated as 'Good'/100 (Number of Manufactured Tires)×100(%) <Equation 4>

Experimental Example 5: Measurement of Tire Durability

The durability of the tire manufactured in Experimental Example 4 was tested and evaluated while increasing a load, according to the FMVSS139 tire durability measuring method.

The measurement of durability was conducted by two methods of an endurance test which increases load by step loading and a high speed test which increases speed, and it was confirmed whether or not a crack was generated inside a tire, and it was indicated as 'good' when there was no crack, and as 'poor' when a crack was generated.

The final appearance of tires was evaluated by the method of Experimental Example 4, and 20 tires with 'good' appearance were selected, and the endurance test and the high speed test were progressed for each of 10 tires to confirm whether or not a crack was generated. Further, after measuring durability for 10 tires, the durability of tires according to the endurance test and the high speed test was calculated by the following Equation 5, using the number of 'good' tires without crack generation.

Durability of Tires (%)=Number of 'Good' Tires/10 (Number of Evaluated Tires)×100(%) <Equation 5>

Experimental Example 6: Measurement of Internal Pressure Retention

For the tires manufactured in Experimental Example 4, 90-day internal pressure retention was measured at a temperature of 21° C. under pressure of 101.3 kPa according to ASTM F1112-06, as shown in the following Equation 6.

Internal Pressure Retention (%)={1−(Internal Pressure of Tire at First Evaluation−Internal Pressure of Tire After Being Left for 90 Days)/(Internal Pressure of Tire at First Evaluation)}×100 <Equation 6>

The results of Experimental Examples 1 to 6 are shown in the following Table 1

TABLE 1

|  | Example 1 | Example 2 | Example 3 | Example 4 | Example 5 | Comparative Example |
|---|---|---|---|---|---|---|
| Oxygen permeability [$cm^3/(m^2 \cdot 24\ h \cdot atm)$] | 156 | 118 | 183 | 74 | 106 | 18 |
| Modulus balance (MD/TD) | 0.98 | 0.85 | 1.13 | 1.17 | 1.01 | 1.42 |
| Impact strength balance (MD/TD) | 1.03 | 0.83 | 1.09 | 1.19 | 1.04 | 1.67 |
| Moldability (%) | 100 | 100 | 100 | 98 | 100 | 31 |
| Tire durability (%) Endurance Test | 100 | 100 | 100 | 90 | 100 | 0 |
| High Speed Test | 100 | 100 | 100 | 100 | 100 | 50 |
| Internal pressure retention (%) | 96.9 | 97.8 | 96.4 | 98.4 | 97.1 | 98.7 |

As shown in Table 1, it was confirmed that the inflation films manufactured in the examples exhibit physical properties that are uniform and excellent in all directions, and have low modulus while having a relatively high tensile strength and impact strength, and specifically, the ratio of the machine direction modulus of the base film to the transverse direction modulus of the base film at 25% elongation, after heat-treating the base film at 170° C. for 30 minutes, is in the range of 0.85 to 1.17, so that the modulus along the direction was uniform and the stress applied to the film during the molding process and the vulcanization process of a tire can be uniformly dispersed.

In addition, it was confirmed that, in the inflation films manufactured in the examples, the ratio of impact strength for the machine direction of the base film to impact strength for the transverse direction of the base film, after heat-treating the base film at 170° C. for 1 hour, is 0.83 to 1.19, so that the pneumatic tire provided with the inflation film easily disperses the stress applied from the outside during running of the automobile, thereby reducing the occurrence of cracks due to stress concentration.

Finally, it was confirmed that in the inflation films manufactured in the examples exhibit oxygen permeability of 183 $cm^3/(m^2 \cdot 24\ h \cdot atm)$ or less even at a thickness of 30 μm to 210 μm, and thus, can realize an excellent gas barrier property even with a thin thickness, and can secure high durability when applied to a tire as well as excellent moldability.

The invention claimed is:

1. A method for manufacturing the inflation film for a tire inner liner, comprising a step of inflation a molten resin composition including: a polyamide-based resin; a copolymer containing a polyamide-based segment and a polyether-based segment; and an olefin-based polymer compound at a blow-up ratio (BUR) of 1.5 to 3,
   wherein the molten resin composition is inflated at a draw-down ratio (DDR) of 1 to 20,
   wherein the olefin-based polymer includes an olefin-based polymer or copolymer grafted with a dicarboxylic acid or an acid anhydride thereof,
   wherein the polyamide-based resin and copolymer containing polyamide-based segments and poly-ether-based segments are included in a base film formed from the molten resin composition at a weight ratio of 9:1 to 1:9, and
   the content of the polyether-based segments in the base film is 2% by weight to 40% by weight, and
   a ratio of a machine direction modulus of the base film to transverse direction modulus of the base film at 25% elongation after heat-treating the base film at 170° C. for 30 minutes, is from 0.8 to 1.2.

2. The method for manufacturing the inflation film for a tire inner liner according to claim 1, wherein, in the step of inflating a molten resin composition at a blow-up ratio (BUR) of 1.5 to 3, a bubble diameter is 450 to 2000 mm, and a die diameter is 300 to 800 mm.

3. The method for manufacturing the inflation film for a tire inner liner according to claim 1, wherein, in the step of inflating a molten resin composition at a draw-down ratio (DDR) of 1 to 20, a die gap thickness is 0.5 to 3.5 mm, and the film thickness is 20 to 300 μm.

4. The method for manufacturing the inflation film for a tire inner liner according to claim 1, wherein the temperature inside a bubble of the molten resin composition formed in the step of inflating the molten resin composition is 10° C. to 60° C.

5. The method for manufacturing the inflation film for a tire inner liner according to claim 1, further comprising a step of melting and extruding the polyamide-based resin, the copolymer containing polyamide-based segments and polyether-based segments, and the olefin-based polymer compound at 200° C. to 300° C. to form the molten resin composition.

6. The method for manufacturing the inflation film for a tire inner liner according to claim 1, further comprising:
   a step of folding and cooling the molten resin composition by a nip roll; and a step of winding the cooled melt resin composition.

7. The method for manufacturing the inflation film for a tire inner liner according to claim 1, further comprising a step of forming an adhesive layer on at least one side of the base film and that includes a resorcinol-formalin-latex (RFL)-based adhesive.

* * * * *